(12) United States Patent
Hua et al.

(10) Patent No.: US 7,686,882 B2
(45) Date of Patent: Mar. 30, 2010

(54) TITANIUM DIOXIDE PIGMENT HAVING IMPROVED LIGHT STABILITY

(75) Inventors: Duen-Wh Hua, Edgewood, MD (US); Fu-Chu Wen, Severna Park, MD (US)

(73) Assignee: Millennium Inorganic Chemicals, Inc., Hunt Valley, MD (US)

( * ) Notice: Subject to any disclaimer, the term of this patent is extended or adjusted under 35 U.S.C. 154(b) by 0 days.

(21) Appl. No.: 11/851,746

(22) Filed: Sep. 7, 2007

(65) Prior Publication Data

US 2008/0047471 A1    Feb. 28, 2008

Related U.S. Application Data

(60) Division of application No. 10/999,714, filed on Nov. 30, 2004, now Pat. No. 7,285,162, which is a continuation-in-part of application No. 10/837,060, filed on Apr. 30, 2004, now abandoned, which is a continuation of application No. 09/921,502, filed on Aug. 1, 2001, now Pat. No. 6,743,286.

(60) Provisional application No. 60/308,963, filed on Jul. 30, 2001.

(51) Int. Cl.
*C09C 1/20* (2006.01)
*C09C 1/36* (2006.01)
*B32B 15/02* (2006.01)
*B32B 17/02* (2006.01)
*B32B 19/00* (2006.01)

(52) U.S. Cl. .............. 106/433; 106/442; 106/443; 106/446; 106/447; 428/403

(58) Field of Classification Search .............. 106/443, 106/446, 438, 442, 447, 433; 428/403
See application file for complete search history.

(56) References Cited

U.S. PATENT DOCUMENTS

| | | | |
|---|---|---|---|
| 2,885,366 A | | 5/1959 | Iler |
| 3,437,502 A | * | 4/1969 | Werner ................. 106/437 |
| 4,028,173 A | | 6/1977 | Olson |
| 4,714,603 A | | 12/1987 | Vanderheiden |
| 4,874,466 A | | 10/1989 | Savino |
| 5,152,835 A | | 10/1992 | Nemeh |
| 5,215,580 A | | 6/1993 | Elfenthal et al. |
| 5,340,393 A | * | 8/1994 | Jacobson ................. 106/492 |
| 5,385,960 A | | 1/1995 | Emmons et al. |
| 5,551,975 A | | 9/1996 | Freeman et al. |
| 5,650,002 A | | 7/1997 | Bolt |

(Continued)

FOREIGN PATENT DOCUMENTS

EP           0799865           8/1997

(Continued)

OTHER PUBLICATIONS

European Patent Search Report, European Patent Office, 3 pages, Nov. 21, 2008.

*Primary Examiner*—Anthony J Green
*Assistant Examiner*—Pegah Parvini
(74) *Attorney, Agent, or Firm*—Dunlap Codding, P.C.

(57) ABSTRACT

In various embodiments, methods and compositions are provided comprising titanium dioxide and silica spacers having improved light stability for use in paper, plastic and paints.

9 Claims, 2 Drawing Sheets

Silica Spacers with Titanium Dioxide

U.S. PATENT DOCUMENTS

| | | | |
|---|---|---|---|
| 5,650,030 A * | 7/1997 | Kyricos | 156/192 |
| 5,785,748 A | 7/1998 | Bankford et al. | |
| 5,861,209 A | 1/1999 | Haskins et al. | |
| 5,886,069 A | 3/1999 | Bolt | |
| 6,077,341 A | 6/2000 | Terase et al. | |
| 6,090,373 A | 7/2000 | Oshima et al. | |
| 6,143,064 A | 11/2000 | Virtanen | |
| 6,200,375 B1 * | 3/2001 | Guez et al. | 106/438 |
| 6,340,387 B1 | 1/2002 | Orth-Gerber et al. | |
| 6,342,099 B1 * | 1/2002 | Hiew et al. | 106/443 |
| 6,432,535 B1 * | 8/2002 | Noguchi et al. | 428/403 |
| 6,455,751 B1 | 9/2002 | Hoffman et al. | |
| 6,579,410 B1 | 6/2003 | Bleakly et al. | |
| 6,743,286 B2 | 6/2004 | Hua et al. | |
| 7,285,162 B2 | 10/2007 | Hua et al. | |
| 2002/0122931 A1 * | 9/2002 | Brownfield et al. | 428/324 |

FOREIGN PATENT DOCUMENTS

| | | |
|---|---|---|
| EP | 0803550 | 10/1997 |
| EP | 0844213 A1 | 5/1998 |
| EP | 0892019 | 1/1999 |
| EP | 0861299 | 4/2000 |
| FR | 2744914 | 2/1996 |
| FR | 2750693 | 7/1996 |
| WO | WO 98/50472 | 11/1998 |
| WO | WO 00/32700 | 6/2000 |
| WO | WO 00/78874 | 12/2000 |

* cited by examiner

Figure 1: Silica Spacers with Titanium Dioxide

Figure 2: Silica Spacers with Titanium Dioxide

TITANIUM DIOXIDE PIGMENT HAVING IMPROVED LIGHT STABILITY

This application is a divisional application of U.S. patent application Ser. No. 10/999,714, filed Nov. 30, 2004, now U.S. Pat. No. 7,285,162 which is a continuation-in-part application of U.S. patent application Ser. No. 10/837,060, filed Apr. 30, 2004, now abandoned which is a continuation of U.S. patent application Ser. No. 09/921,502, filed Aug. 1, 2001, now U.S. Pat. No. 6,743,286, which claims benefit of the filing of U.S. Provisional Application No. 60/308,963 filed Jul. 30, 2001, the entire disclosures of which are hereby incorporated by reference.

BACKGROUND OF THE INVENTION

Titanium dioxide base pigment particles are often incorporated into many products such as paint, plastic, paper, laminates or other coating systems. This pigment imparts desirable properties such as brightness, opacity, light scattering, and light stability.

Upon prolonged exposure to light, many titanium dioxide pigment products will degrade and the product's color will fade over time. UV radiation from light is particularly damaging to titanium dioxide pigment products. The ability of titanium dioxide to resist degradation when exposed to light is known as light stability and is partially due to the pigment's ability to scatter light.

It is known that light scattering ability of a pigment does not improve above a certain pigment concentration due to an effect known as crowding. The crowding effect severely limits, not only light scattering ability of a pigment, but also light stability, brightness and opacity. Typically, at high pigment concentrations, when titanium dioxide pigment particles are close to each other, there is an overlap of light scattering causing a severe reduction in the pigment's overall light scattering efficiency and light stability.

There has been considerable research involving ways to reduce crowding and improving light stability. In paper products, keeping the titanium dioxide pigment particles spaced about 0.1 mm or more apart from each other can reduce the crowding effect. One way to keep the pigment appropriately spaced is to add a spacer to the pigment. This may improve light scattering ability and stability as well as brightness and opacity of the pigment.

Spacers typically cost less than the titanium dioxide base pigment and therefore reduce the cost to make the titanium dioxide product. Some examples of spacers used to with titanium dioxide products include calcium carbonate, clay, silica, alumina, and other metal oxides.

In general, the size, charge and the resulting flocculation behavior when the spacer is incorporated into the pigment are also important for light scattering and stability. There have been attempts to blend or mix titanium dioxide pigment particles with spacers resulting in spaced pigment products. However, blending or mixing may reduce light scattering ability and light stability of the pigment product due to unwanted agglomeration. For example, when clay is mechanically mixed or blended with titanium dioxide, it is difficult to control the distribution of clay spacer particles throughout the mixture uniformly because the clay particles do not attach effectively to the surfaces of the titanium dioxide particle. The clay particles agglomerate, which reduces light scattering and stability of the pigment product, Direct in situ precipitation of the spacer on the titanium dioxide pigment is another method to attach the spacer to the base pigment. This method involves precipitating the spacer onto the pigment. However, achieving the proper size and shape of the spacer to produce a titanium dioxide pigment product with improved light scattering ability and stability remains a problem in the art.

There remains a need for titanium dioxide pigments with improved light scattering ability and stability for use in products such as paints, paper, laminates and plastics. Methods and compositions for making spaced titanium dioxide pigments that have minimal agglomeration and improved light scattering ability and stability are needed.

SUMMARY OF THE INVENTION

The present invention provides titanium dioxide pigment having improved light stability made by precipitation of silica spacers on the titanium dioxide pigment. These pigments improve the optical performance, for example light stability and light scattering ability, of the paper, laminate, paint, and plastic titanium dioxide based products.

In one embodiment, the present invention provides titanium dioxide having improved light stability comprising: a base titanium dioxide particle having a substantially spherical shaped silica spacer particle deposited thereon, the silica spacer particle having a size range between about 5 to about 50 nanometers, wherein the silica spacer particle is present in an amount of between about 7 to about 20% by weight based on the total weight of the titanium dioxide.

In another embodiment, the present invention provides titanium dioxide having improved light stability comprising: a base titanium dioxide particle coated with a phosphate compound, and a substantially spherical shaped silica spacer particle deposited thereon, the silica spacer particle having a size range between about 5 to about 50 nanometers, wherein the silica spacer particle is present in an amount of between about 7 to about 20% by weight based on the total weight of the titanium dioxide.

In yet another embodiment, the present invention provides a method for preparing coated titanium dioxide having improved light stability, comprising: preparing an aqueous slurry of titanium dioxide; and adding a silica compound to the slurry so as to form substantially spherical shaped silica spacers having a particle size range between about 5 to about 50 nanometers, wherein the substantially spherical shaped silica spacer is present in an amount of between about 7 to about 20% by weight based on weight of the titanium dioxide.

In one exemplary embodiment, the present invention providers a method for improving light stability of titanium dioxide, comprising: preparing an aqueous slurry of titanium dioxide; and adding a silica compound to the slurry in an amount of between about 7 to about 20% by weight based on weight of the titanium dioxide to form the titanium dioxide having improved light stability.

In another exemplary embodiment, the present invention provides a method for improving light stability of titanium dioxide, comprising: preparing an aqueous slurry of titanium dioxide; adding a silica compound to the slurry in an amount of between about 7 to about 20% by weight based on the weight of the titanium dioxide; and adding an alumina or phosphate compound to the slurry to form the titanium dioxide having improved light stability.

In a further embodiment, the present invention provides a method of improving light stability of titanium dioxide, comprising: preparing an aqueous slurry of titanium dioxide; adding a silica compound to the slurry in an amount of between about 7 to about 20% by weight based on weight of the titanium dioxide; and adding a retention aid to the slurry to form the titanium dioxide having improved light stability.

BRIEF DESCRIPTION OF THE FIGURES

Preferred embodiments of the invention have been chosen for purposes of illustration and description, but are not intended in any way to restrict the scope of the invention. The preferred embodiments of certain aspects of the invention are shown in the accompanying figure, wherein.

DETAILED DESCRIPTION OF THE INVENTION

The invention will now be described in connection with preferred embodiments. These embodiments are presented to aid in an understanding of the present invention and are not intended to, and should not be construed to, limit the invention in any way. All alternatives, modification and equivalents that may become obvious to those of ordinary skill when reading the disclosure are included within the spirit and scope of the present invention.

This disclosure is not a primer on titanium dioxide pigment production, basic concepts known to those skilled in field of pigment production have not been set forth in detail. Concepts such as choosing appropriate additives and reactions producing pigments are readily determinable by those skilled in the industry and are generally described in the prior art. Attention is therefore directed to the appropriate texts and references known to those skilled in the art in regard to these matters.

Titanium Dioxide

Titanium dioxide particles used to make the titanium dioxide pigments of the present invention can be base titanium dioxide. Titanium dioxide bases suitable for use in the present invention are produced commercially in two crystalline polymorphic forms, namely the rutile form, which can be produced by either the chloride and sulfate processes and the anatase form, which is normally produced by the sulfate process. Both of these processes are well known in the art. The titanium dioxide base does not need to be pure and may include small quantities of impurities (e.g., iron), additives (e.g., potassium oxide), and surface coatings. Preferably, the titanium dioxide base particles of the present invention have a substantially uniform particle size. As used herein "titanium dioxide particle" includes any discrete unit of titanium dioxide base.

The methods and compositions of the present invention include forming an initial slurry of base titanium dioxide particles. Slurries of titanium dioxide can be made by methods known in the art. Preferred titanium dioxide slurries for use in the present invention are aqueous slurries comprising a titanium dioxide content of less than about 50%, preferably less than about 40%, and more preferably less than about 30% by weight of the slurry. However, the present invention is not intended to be limited to any particular titanium dioxide content and solids contents that are higher and lower can be used. The titanium dioxide pigments of the present invention can be coated with inorganic hydrous oxides, such as for example, alumina, silica, and/or phosphate. Coated titanium dioxide refers to base titanium dioxide particles that have a partial or complete layer or deposit of inorganic hydrous oxide.

The titanium dioxide pigments of the present invention preferably have a surface area of less than 32 $m^2/g$, more preferably less tan 30 $m^2/g$ and most preferably between about 29 and 25 $m^2/g$.

Silicon Compounds

In one embodiment of the present invention, a silicon compound is added to the slurry of titanium dioxide, precipitated on the titanium dioxide and becomes the silica spacer. The silicon compound may be added to the slurry in one, two or more additions. Silicon compounds suitable for use in the present invention include, but are not limited to, water soluble alkali metal silicates. Prefer water-soluble alkali metal silicates include sodium silicate, potassium silicate, and the like. These silicon compounds provide discrete deposits of $SiO_2$ on the base particle. Most preferably, the silicon compound is sodium silicate that is precipitated in situ on the base particle as $SiO_2$.

The weight percent of the silicon compound in the slurry for improved light stability can vary depending on the extent of spacing desired. When silicon is deposited on the titanium dioxide base pigment, the silicon compound is added to the slurry in an amount from about 7 to about 20% by weight based on the total weight of the titanium dioxide pigment. Preferably, the amount of silicon based on the titanium dioxide weight is between about 7 to about 15%. More preferably, the amount of silicon based on the titanium dioxide weight is between about 10 to about 15%.

The silicon is deposited or precipitated on the titanium dioxide as discrete silica particles preferably having an average particle size range of about 5 to about 50 nanometers. The resultant silica spacer has a substantially spherical shape. As used herein, substantially spherical, includes, but is not limited to, inorganic particle deposits that are of a smooth rounded shape that lack projections and/or cavities on the surface (see, for example FIGS. 1 and 2). Examples of substantially spherical shapes that are useful for various embodiments of the present invention include, but are not limited to, spherical, spheroidal, globular and the like. This substantially spherical shape is comparable to the commercial colloidal silica (e.g., LUDOX), but which does not have the advantage of being bonded to the base particles. For the purposes of the present invention, non-spherical shapes include irregular shaped inorganic particles that have projections and/or cavities on the surface. Such shapes include square, nearly square, rectangular, needle, rod, flake, and the like.

In one embodiment of the present invention, phosphate or sulfate ions are used to enhance the spherical shape. It is believed that surface energy and charges from sulfate and phosphate ions enhance the substantially spherical shape. By using sulfate and/or phosphate ions, silica spheres with a defined shape can be formed. The substantially spherical spacers formed are used to space the titanium dioxide and avoid the crowding effect. The silica spacer includes discrete deposits of $SiO_2$ on the base particle that keep the titanium dioxide particles appropriately spaced apart from each other and thus reduce the crowding effect. For example, in paper products, keeping the titanium dioxide pigment particles spaced about 0.1 mm or more apart from each other can reduce the crowding effect.

Suitable conditions for the silica precipitation reaction include temperature and pH of the slurry. Preferred pH ranges allow discrete silica particles to be deposited on the titanium dioxide base. The specific pH can be determined by those skilled in the art and adjusted to a desired pH range used by methods known in the art. For example, if adjustment of the pH of the slurry becomes necessary, pH adjustments can be made by adding a suitable acid, or suitable base. Most preferably, the pH is adjusted to the range of from about 5.0 to about 7.0 over a period of from about 15 to about 60 minutes after the silica compound is added.

The temperature of the slurry can be controlled to optimize the deposition of the silica compound on the pigment. Preferably, temperatures between about 30 to about 100° C. are needed to optimize the silica spacer deposit on the titanium dioxide Surfactants In another embodiment of the present invention, to avoid large lumps of silica aggregates, and enhance the formation of substantially spherical spacers deposited on the titanium dioxide pigment, a surfactant can be added to the slurry. The surfactant can prevent the fusion of silica and improve the flow and dispersion properties of the titanium dioxide pigment.

Surfactants are surface active agents that can alter the morphology of the titanium dioxide. Suitable surfactants for use in the present invention include anionic, cationic, amphoteric, and non-ionic surfactants. The surfactant may be water soluble or hydrophobic. Suitable surfactants must interact with the silica compound during precipitation of the silica spacer on the titanium dioxide pigment. The surfactant aids in viscosity, dispersibility, and light stability.

A wide variety of surfactants can be used in the present invention. Suitable surfactants include polyacrylic acid or derivatives thereof. Some examples of polyacrylic acids and/or derivatives thereof include polyacrylic acid homopolymers, polyacrylic acid copolymers, and mixtures thereof. Preferably, the acrylic acid homopolymer and acrylic acid copolymers of the present invention include at least one comonomer selected from the group consisting of maleic acid, methacrylic acid, itaconic acid, crotonic acid, fumatic acid, acrylamide, acrylonitrile, ethylene, propylene, styrene and esters of the above acids, wherein the homopolymers or copolymers have been partially or completely neutralized with a neutralizing agent having a monovalent group. These surfactants can be present in amounts up to about 5 weight-percent. When the surfactant is used in titanium dioxide pigments, the surfactant is present in amounts of from about 0.05 to about 5 weight-percent, more preferably from about 0.2 to about 1 weight-percent; and most preferably from about 0.2 to about 0.5 weight-percent based on the total weight of titanium dioxide.

Phosphate compounds are preferred surfactants. Suitable phosphate compounds for use in the present invention include water soluble phosphate compounds, such as for example, tetrapotassium pyrophosphate, sodium polyphosphate, tetrasodium pyrophosphate (Tetron™), sodium tripolyphosphate, potassium tripolyphosphate, sodium hexametaphosphate (Calgon™), phosphoric acid, and the like.

The phosphate compound can be added to the titanium dioxide slurry in amounts of from about 0.05 to about 3 weight-percent, more preferably from about 0.2 to about 1 weight-percent; and most preferably from about 0.2 to about 0.5 weight-percent based on the total weight of titanium dioxide. For example, in paper laminate applications, phosphate ($P_2O_5$) ions reduce the photocatalytic effect of titanium dioxide. The addition of $P_2O_5$ not only serves as a surface activating agent, but also, if there is an alumina coating, serves to improve the alumina surface coating retention, and change the crystallinity of the formed alumina. It was discovered that the preferred amount of $P_2O_5$ is between 2 to 3%, which allows production of pigments having improved light stability.

Aluminum Compounds

In another embodiment of the present invention, an aluminum compound can also be deposited on the base titanium dioxide pigment in the presence of a surfactant. Aluminum compounds include hydrous aluminum compounds, which include but are not limited to sodium aluminate, potassium aluminate, or aluminum sulfate. Most preferably, the aluminum compound is sodium aluminate or aluminum sulfate. The weight percent of the aluminum compound can vary. When the aluminum compound is precipitated as alumina on the titanium dioxide base, preferably, the aluminum compound is added to the slurry in an amount to provide from about 1.5% to about 5.0% by weight aluminum based upon the total weight of the titanium dioxide.

After the silicon, aluminum and/or surfactant compounds have been added, the titanium dioxide can be washed substantially free of soluble salts adhering to the pigment, dried and then subjected to final comminution using fluid energy milling techniques known in the art. Optionally, the washed and dried pigment is micronized in a steam micronizer at intensities known by those skilled in the art to produce the desired particle size distribution.

Light Stability

The titanium dioxide pigments of the present invention have improved light stability. As used herein "tight stability" is a phrase known in the art and includes the ability of titanium dioxide to resist degradation when exposed to light. For example, untreated titanium dioxide is photoactive and the pigment will fade or change color upon UV exposure. In one embodiment of the present invention, it was discovered that for paper laminates improved light stability resulted in the final product when silicon and phosphate compounds were added when compared to conventional titanium dioxide pigments known in the art. The phosphate ($P_2O_5$) ions reduced the photocatalytic effect of light on titanium dioxide.

Some methods for testing light stability include melamine formaldehyde (M/F) plug test, spectrophotometry, and colorimeteric testing. M/F plug test involves assessing the stability of melamine formaldehyde molding powder that is heated and pressed into a solid plug and exposed to Xenon Arc lamp radiation for a set period of energy exposure. Color measurements are taken before and after exposure, the differences are calculated along with the total color change from the pre-exposed values. In one embodiment of the present invention, the optical performance of different pigments with and without retention ad were compared. The results are shown in Table C.

Light scattering is an art recognized term and includes the ability of the pigment to scatter light after selectively absorbing some of the light. The light scattering effect of the pigment gives the product its perceived color. Scattering will also contribute to opacity. Light scattering can be tested by any method known in the art. Suitable light scattering testing methods includes but are not limited to, measuring light scattering coefficient, hiding power, tinting strength, and the like.

In one embodiment of the present invention, the silica spaced titanium dioxide is used in laminate coating formulations, and selves to space titanium dioxide particles to reduce the crowding effect and unexpectedly improve the optical performance. This is demonstrated in Examples 1 and 2. When using silica spaced $TiO_2$, at the same weight, the optical performance is better in brightness with the same opacity.

In another embodiment of the present invention, to improve the optical performance in paper applications, a retention aid is added to the silica spaced titanium dioxide to improve optical performance. For example, the IEP (isoelectric point) of pigments of the current invention are usually low, which means within the paper making pH range, the pigments are negatively charged. This negative charge combined with the fact that the pulp fibers are also negatively charged, results in poor retention. The retention can be improved by using retention aids such as alum, PAC (poly aluminum chloride), polyamide, epichlorohydrin, polyethyleneimine, and polyacrylamide; cationic formaldehyde and melamine formaldehyde resins; cationic starch, chitosan, and the like. Other positively charged filler particles, such as for example, calcium carbonate, precipitated calcium carbonate; and aluminum trihydrate can also be used as retention aids. Referring to Example 3, titanium dioxide pigment compositions that had an alum retention aid showed unexpectedly improved optical performance (data shown in Table C).

Having now generally described the invention, the same may be readily understood through the following reference to the examples, which are provided by way of illustration and are not intended to limit the present invention unless specified.

TABLE A

Light Stability (18-hour Melamine/Formaldehyde plug test)

| RCL-722 | Example 1 |
|---|---|
| ΔE 0.8 | 0.85 |

TABLE B

Paper Laminate Coatings Testing (Acrylic Melamine Resins with 26% $TiO_2$)

| | RCL 722 | Example 1 |
|---|---|---|
| White | | |
| L | 95.51 | 95.92 |
| a | −0.43 | −0.47 |
| b | 0.88 | 1.2 |
| Black | | |
| L | 94.81 | 95.15 |
| a | 4.0 | −0.95 |
| b | −0.33 | 0.32 |
| Contrast Ratio | | |
| | 0.993 | 0.994 |

EXAMPLES

Example 1

Figure 1:
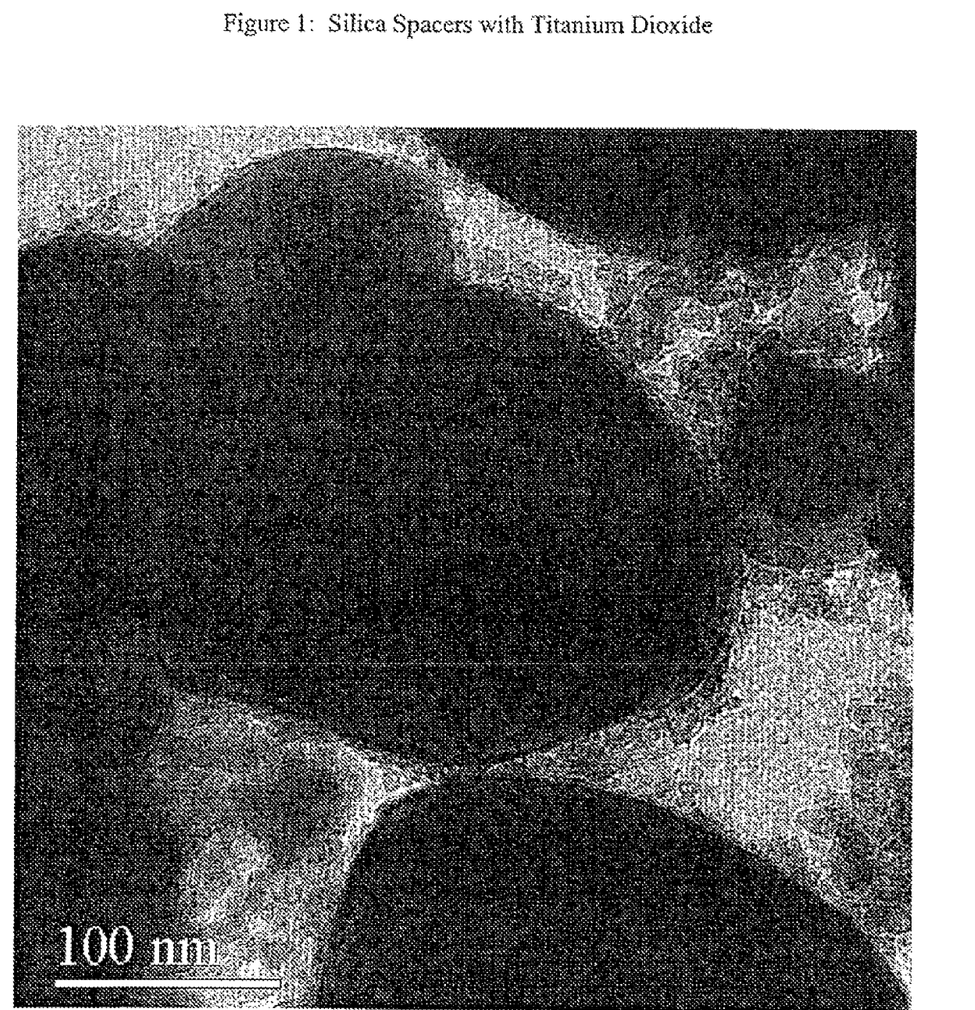
FIG. 1 is a transmission electron micrograph of precipitate silica spacer particles formed by a direct precipitation process, with phosphate (produced in Example 1). The substantially spherical shaped silica coated titanium dioxide has improved optical performance with less use of titanium dioxide.

2000 g base rutile titanium dioxide slurry was prepared having 45.34% solids. The solids content was adjusted to 24.4%. Treatment temperature was set at 70° C. 1.25% of $P_2O_5$ (based on the weight of $TiO_2$) was added in the form of phosphoric acid. To this slurry, 6.5% of $SiO_2$ (based on the weight of $TiO_2$) was added in the form of sodium silicate while maintaining the pH under 5.6 using phosphoric acid. The slurry was aged for 10 minutes, and another 5% of $SiO_2$ was added. The slurry pH was adjusted to 4.8 and 5% of $Al_2O_3$ (based on the weight of $TiO_2$) in the form of sodium aluminate was added. After 10 minutes of aging, the pH of the slurry was adjusted to 8-8.2 with HCl. The slurry was retained for 5 minutes and the pH was adjusted to the final pH of 5.8. The resulting slurry was washed and filtered. The wet cake obtained was dried at 120° C. overnight. The dry cake was screened and air micronized. FIG. 1 is the transmission electron micrograph of the pigment produced in Example 1 (with phosphate addition). The light stability of $TiO_2$ pigment was assessed in a melamine formaldehyde molding powder that is heated and pressed into a solid plug and exposed to Xenon Arc lamp radiation for a set period of energy exposure. Color measurements are taken before and after exposure, the differences are calculated along with the total color change from the pre-exposed values. Overall color changes are measured by the following formula, where ΔE is the overall color change:

$$\Delta E = \sqrt{L^2 + a^2 + b^2}$$

The resulting product in Example 1 has a ΔE lower than 1 using M/F plug light stability test (18-hour UV exposure). When compared with commercial $TiO_2$ pigment (RCL 722) for the paper laminate application, it showed the benefit of reducing $TiO_2$ use and improving or maintaining virtually the same optical performance of brightness and opacity. For example, the paper laminate coating tests whiteness, tone and color of the paper laminate (see Tables A and B).

Example 2

Figure 2:
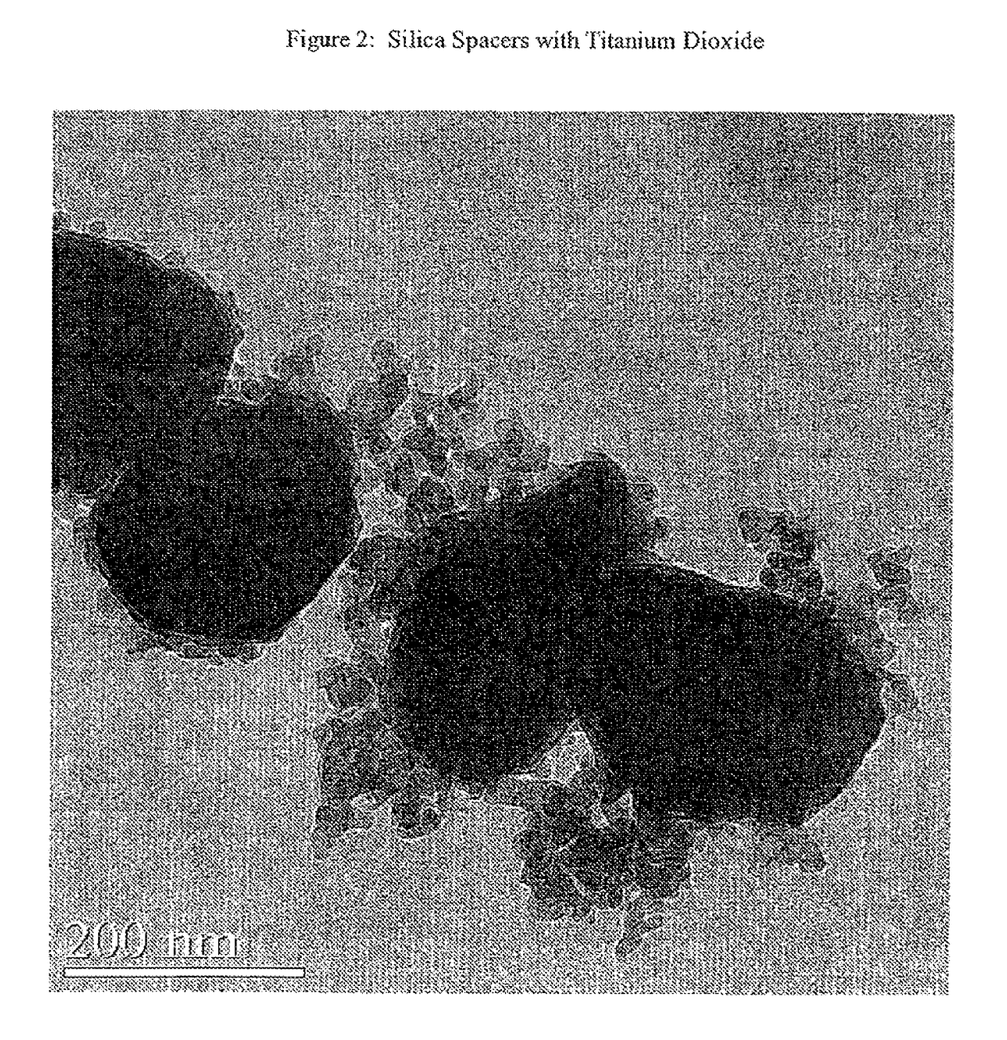
FIG. 2 is a transmission electron micrograph of precipitate silica spacer particles formed by a direct precipitation process, without phosphate (produced in Example 2). The substantially spherical shaped silica coated titanium dioxide has improved optical performance with less use of titanium dioxide.

Rutile titanium dioxide base slurry of 2000 g was prepared having 45.34% solids content, which was adjusted to 24.4%. Treatment temperature was set at 70° C. 1.25% of $SO_4$ (based on the weight of $TiO_2$) was added in the form of sulfuric acid. To this slurry, 6.5% of $SiO_2$ (based on the weight of $TiO_2$) was added in the form of sodium silicate while maintaining the pH under 5.6 using sulfuric acid. The slurry was aged for 10 minutes, and 5% $SiO_2$ was added to the slurry. The pH was adjusted to 4.8 and 5% of $Al_2O_3$ (based on the weight of $TiO_2$) was added in the form of sodium aluminate. After 10 minutes of aging, the slurry pH was adjusted to 8-8.2 with HCl, and the slurry's residence time was 5 minutes. The final pH was adjusted to 5.8. The resulting slurry was washed and filtered. The wet cake obtained from the process was dried at 120° C. overnight. The dry cake was screened and air micronized. FIG. 2 is a transmission electron micrograph of the pigment produced in Example 2 (without phosphate addition). The resulting product has ΔE larger than 1 using a M/F plug light stability test (18-hour UV exposure). When compared with commercial $TiO_2$ pigment for the paper laminate application, it showed the benefit of reducing $TiO_2$, use and improving or maintaining the optical performance of brightness and opacity.

Example 3

RCL-722 is a commercial pigment from Millennium Inorganic Chemicals for paper laminate application that has titanium dioxide content greater than 20%. The optical performance of RCL-722 (with and without retention aid) was compared to the pigment of Example 1 and a mixed pigment blend that contained RCL 722 60% and 40% of the pigment from Example 1. The solids contents of different formulation and surface areas were varied. The optical performance results are summarized in Table C. There was unexpected improvement in optical performance (e.g., brightness, opacity and light stability) when an alum retention aid was added to the pigment as compared to pigments without the retention aid. It was also unexpected that as the titanium dioxide base weight % was lowered, that optical performance (e.g., brightness, opacity and light stability) was maintained. This is shown by comparing the pigments of Example 1+alum to the RCL-722+alum pigments. The optical performance is virtually the same, however, less titanium dioxide was used for the Example 1+alum pigments.

TABLE C

| Sample | Wt of TiO$_2$ base. | TiO$_2$ g/m2 | % Ash | Tappi Opacity | Brightness | *L | *a | *b |
|---|---|---|---|---|---|---|---|---|
| Optical Performance Wet-End (no retention aid) | | | | | | | | |
| RCL 722 | | | | | | | | |
| 1 | 54.37 | 19.62 | — | 93.96 | 92.05 | 97.25 | −0.43 | 2.5 |
| 2 | 55.78 | 21.91 | — | 94.85 | 92.67 | 97.37 | −0.4 | 2.21 |
| 3 | 57.6 | 20.98 | 30.46 | 95.34 | 92.26 | 97.17 | −0.4 | 2.23 |
| Average | 55.92 | 20.84 | 30.46 | 94.72 | 92.33 | 97.26 | −0.41 | 2.31 |
| Example 1 | | | | | | | | |
| 1 | 47.75 | 13.42 | — | 92.34 | — | — | — | — |
| 2 | 45.63 | 10.1 | — | 89.02 | 91.73 | 97 | −0.43 | 2.39 |
| 3 | 45.92 | 11.09 | 15.86 | 89.79 | 91.65 | 97.08 | −0.45 | 2.55 |
| Average | 48.43 | 11.54 | 15.86 | 90.38 | 91.69 | 97.04 | −0.44 | 2.47 |
| 60:40 Blend (RCL 722/Ex. 1) | | | | | | | | |
| 1 | 61.97 | 25.31 | — | 96.47 | 93.24 | 97.53 | −0.38 | 2.06 |
| 2 | 60.58 | 21.17 | — | 96.19 | 93.14 | 97.56 | −0.41 | 2.17 |
| 3 | 54.47 | 19.13 | 32.19 | 94.77 | 93.25 | 97.59 | −0.4 | 2.11 |
| Average | 59.00 | 21.87 | 32.19 | 95.81 | 93.21 | 97.56 | −0.40 | 2.11 |
| Wet-end (with alum retention aid) | | | | | | | | |
| RCL-722 + ALUM | | | | | | | | |
| 1 | 81 | 29.1 | — | 98.32 | 92.22 | 96.36 | −0.43 | 1.09 |
| 2 | 81.7 | 29.05 | 39.56 | 98.32 | 91.72 | 96.14 | −0.47 | 1.13 |
| Average | 81.35 | 28.08 | 39.56 | 98.32 | 91.97 | 96.25 | −0.45 | 1.11 |
| Ex1 + Alum | | | | | | | | |
| 1 | 75 | 26.08 | — | 98.18 | 92.02 | 96.26 | −0.36 | 1.1 |
| 2 | 79 | 24.03 | 36.54 | 97.93 | 91.91 | 96.17 | −0.32 | 1.04 |
| Average | 77.00 | 25.06 | 36.54 | 98.06 | 91.97 | 96.22 | −0.34 | 1.07 |

While the invention has been described in connection with specific embodiments thereof it will be understood that is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

What is claimed is:

1. A process for preparing coated titanium dioxide pigment having improved light stability, comprising:
    combining a titanium dioxide base, a phosphate compound and a water soluble silicon compound in an aqueous slurry so as to form a coated titanium dioxide pigment comprising a base titanium dioxide particle coated with a phosphate compound and substantially spherical shaped silica spacer particles having an average particle size range between about 5 to about 50 nanometers, wherein the substantially spherical shaped spacer particles weigh between about 7 to about 20 weight % based on the weight of the titanium dioxide.

2. A process according to claim 1, further comprising combining the coated titanium dioxide pigment with alum.

3. A process according to claim 1, wherein an aluminum compound is added to the slurry of coated titanium dioxide pigment to form an alumina coating.

4. A process for preparing titanium dioxide pigment having improved light stability comprising the steps of:
    (a) preparing an aqueous slurry of base titanium dioxide particles;
    (b) adding a surface coating agent and a silicon compound to the slurry under conditions so as to form substantially spherical shaped silica spacer particles on the base titanium dioxide particles, wherein substantially spherical shaped silica spacer particles have an average particle size range between about 5 to about 50 nanometers; and
    (c) adding a retention aid to the slurry to form the titanium dioxide pigment having improved light stability; wherein said retention aid is polyaluminum chloride, polyamide, epichlorohydrin, polyethyleneimine, polyacrylamide; cationic formaldehyde, melamine formaldehyde resins, cationic starch, chitosan or a combination thereof.

5. A process according to claim 4, wherein the base titanium dioxide particles are anatase or rutile titanium dioxide.

6. A process according to claim 4, wherein the surface coating agent is a phosphate compound.

7. A process according to claim 6, wherein the phosphate compound is selected from a group consisting of tetrapotassium pyrophosphate, sodium polyphosphate, tetrasodium pyrophosphate, sodium tripolyphosphate, potassium tripolyphosphate, sodium hexametaphosphate, phosphoric acid or a combination thereof.

8. A process according to claim 1, wherein the water soluble silicon compound is a water soluble alkali metal silicate.

9. A process according to claim 8, wherein the water soluble alkali metal silicate is sodium silicate.

* * * * *

UNITED STATES PATENT AND TRADEMARK OFFICE
CERTIFICATE OF CORRECTION

PATENT NO. : 7,686,882 B2
APPLICATION NO. : 11/851746
DATED : March 30, 2010
INVENTOR(S) : Duen-Wh Hua and Fu-Chu Wen It is certified that error appears in the above-identified patent and that said Letters Patent is hereby corrected as shown below:

In the Specification:

Column 4, line 7: After "less" delete "tan" and replace with -- than --.

Column 6, line 51: After "retention" delete "ad" and replace with -- aid --.

Signed and Sealed this

Twenty-fifth Day of May, 2010

David J. Kappos
*Director of the United States Patent and Trademark Office*